United States Patent
Waigl

(12) 
(10) Patent No.: US 9,469,413 B2
(45) Date of Patent: Oct. 18, 2016

(54) WARNING CIRCUITRY AND WARNING DEVICE FOR AN AIRCRACT

(71) Applicant: Airbus Operations GmbH, Hamburg (DE)

(72) Inventor: Ilja Waigl, Hamburg (DE)

(73) Assignee: Airbus Operations GmbH (DE)

(*) Notice: Subject to any disclaimer, the term of this patent is extended or adjusted under 35 U.S.C. 154(b) by 31 days.

(21) Appl. No.: 14/552,562

(22) Filed: Nov. 25, 2014

(65) Prior Publication Data

US 2015/0145702 A1 May 28, 2015

(30) Foreign Application Priority Data

Nov. 27, 2013 (EP) .................................. 13194709

(51) Int. Cl.
*G08B 21/00* (2006.01)
*B64D 45/00* (2006.01)
*B64C 1/14* (2006.01)

(52) U.S. Cl.
CPC ............. *B64D 45/00* (2013.01); *B64C 1/1423* (2013.01)

(58) Field of Classification Search
CPC ............................... B64D 45/00; G08B 21/00
USPC .......................... 340/945, 953, 956, 963, 971
See application file for complete search history.

(56) References Cited

U.S. PATENT DOCUMENTS

| 4,635,030 | A | * | 1/1987 | Rauch | ................... | G05D 1/0055 |
| | | | | | | 340/519 |
| 4,915,326 | A | | 4/1990 | Plude | | |
| 5,001,476 | A | * | 3/1991 | Vermilion | ............... | G01C 5/005 |
| | | | | | | 340/963 |
| 6,633,239 | B2 | * | 10/2003 | Plude | ........................ | B64C 1/14 |
| | | | | | | 244/129.3 |
| 8,121,438 | B2 | * | 2/2012 | Farmer | .................. | B64C 1/1407 |
| | | | | | | 340/963 |
| 2008/0048889 | A1 | | 2/2008 | Naegler et al. | | |

FOREIGN PATENT DOCUMENTS

| DE | 10 2005 002 544 A1 | 7/2006 |
| DE | 10 2012 206 877 A1 | 10/2013 |
| WO | 2006/077111 A1 | 7/2006 |
| WO | 2013/160390 A2 | 10/2013 |

OTHER PUBLICATIONS

European Search Report dated Apr. 16, 2014 (EP 13194709.5).

* cited by examiner

*Primary Examiner* — Toan N Pham
(74) *Attorney, Agent, or Firm* — Lerner, David, Littenberg, Krumholz & Mentlik, LLP

(57) ABSTRACT

A warning light circuitry includes a first logic gate adapted for receiving a first, a second, a third, and a fourth input signal; a second logic gate adapted for receiving a fifth, a sixth, and a seventh input signal; a third logic gate electrically connected to the first and second logic gate; and a warning light electrically connected to the third logic gate. The first logic gate is adapted for providing a first output signal to the third logic gate upon receiving the first, the second, the third, and the fourth input signals. The second logic gate is adapted for providing a second output signal to the third logic gate upon receiving the fifth, the sixth, and the seventh input signals. Therein the third logic gate is adapted for triggering the warning light upon receiving the first or the second output signal.

9 Claims, 3 Drawing Sheets

WARNING CIRCUITRY AND WARNING DEVICE FOR AN AIRCRACT

FIELD OF THE INVENTION

The present invention generally relates to a safety and warning system for an aircraft. In particular the present invention relates to a warning circuitry comprising a warning light for an exterior door of an aircraft, a warning device with such warning circuitry and an aircraft with such warning circuitry or warning device adapted for indicating a pressure difference or an actuation of the exterior door.

BACKGROUND OF THE INVENTION

Exterior doors of an aircraft are essential elements of the aircraft and need to fulfill certain safety requirements. For instance after landing an aircraft, a residual pressure may be present in a cabin of the aircraft, i.e. the air pressure in the cabin might be higher than an atmospheric pressure in an environment of the aircraft, and the door may not be opened before such pressure difference has dropped to a certain harmless level. Moreover, aircraft exterior doors are usually equipped with emergency or evacuation slides serving to evacuate passengers and cabin crew in case of an emergency landing.

As exterior doors of aircrafts are usually operated and actuated manually by a cabin attendant after landing, they are nowadays equipped with warning systems triggering a visual and/or acoustic warning signal in case a door is supposed to remain closed and/or locked. Such warning signals may be triggered if a residual pressure is present in the cabin or if a door is actuated while an emergency slide of the respective door is still armed.

WO 2006/077111 A1 and DE 10 2005 002 544 A1 disclose a pressure difference warning system comprising a pressure sensor for measuring a pressure difference between an interior and an exterior region of an aircraft. The warning system further comprises an acoustic signal device designed for outputting an acoustic signal if a measured pressure difference exceeds a specifiable threshold value.

WO 2013/160390 A2 and DE 10 2012 206 877 A1 describe a device for a cabin pressure difference warning for an aircraft or spacecraft comprising a cabin pressure difference sensor means and contact sensor means for detecting a contact by a user with an operating element. The device further comprises a warning signal emitting means for emitting a pressure difference warning signal.

BRIEF SUMMARY OF THE INVENTION

According to an exemplary embodiment of the invention, a warning circuitry with a warning light circuitry for an exterior door of an aircraft is provided. The warning light circuitry comprises a first logic gate adapted for receiving a first, a second, a third, and a fourth input signal. The warning light circuitry further comprises a second logic gate adapted for receiving a fifth, a sixth, and a seventh input signal. The warning light circuitry further comprises a third logic gate electrically connected to the first and second logic gate. The warning light circuitry further comprises a warning light electrically connected to the third logic gate. Therein, the first logic gate is adapted for providing a first output signal to the third logic gate upon receiving the first, the second, the third, and the fourth input signals, and wherein the second logic gate is adapted for providing a second output signal to the third logic gate upon receiving the fifth, the sixth, and the seventh input signals. The third logic gate is adapted for triggering the warning light upon receiving the first or the second output signal.

This may mean that the warning circuitry is designed such that multiple conditions, which may be provided by the various input signals, may trigger the warning light for instance in order to draw the attention of a cabin attendant to a presence of these conditions and the respective situations. In other words, a single warning circuitry may serve to make a cabin attendant aware of various situations represented by the various input signals triggering the warning light. As a consequence, this may mean that various situations may be indicated or displayed by a single warning circuitry with a warning light, thereby reducing components required for a comprehensive warning device and/or warning system, hence saving space required for an installation of such device/system.

Moreover, as a result of reduced components, a warning device/system comprising the prescribed warning circuitry may be advantageous in terms of installation effort, maintenance and reliability.

Apart from that, it may be designed in a compact and low-weight manner.

Additionally, as a single warning circuitry may be used to indicate "do not open the door" with a warning light to any personnel under various and manifold conditions, such warning circuitry may provide an easier door handling procedure to personnel aboard an aircraft since a misinterpretation of the warning light may be unlikely.

The term "exterior door" of an aircraft may not be limited to a cabin door of the aircraft, but may also comprise for instance a freight door, a service door, a flap, a window or any other access element of the aircraft.

The "warning light" may for instance be a single warning light. It may also comprise multiple warning lights or a conglomerate of warning lights, such as e.g. a strip of warning lights. In general the warning light may be a LED light, a light bulb, a neon tube, a fluorescent tube, or any other illuminant.

Furthermore, it may be noted here that the warning light may only be triggered if one of the first and the second output signals is received by the third logic gate. This may mean that for example two conditions or situations, which may be represented by the first to fourth and the fifth to seventh input signals, respectively, may be mutually exclusive. In case both the first and the second output signals are simultaneously provided by the first and second logic gate to the third logic gate, it may be an indication of a malfunction of the warning circuitry or any other device providing at least one of the input signals to the warning circuitry. Consequently, the warning circuitry may additionally serve to detect a malfunction and an error signal may be provided and/or triggered by the warning circuitry in response.

According to an embodiment of the invention, the first and the second logic gates of the warning circuitry are logic AND gates, and the third logic gate is a logic OR gate.

This may mean the two logic AND gates, i.e. the first and second logic gates of the warning circuitry, may be connected in parallel to the logic OR gate, i.e. the third logic gate. Such combination of the two logic AND gates with the logic OR gate may allow to design a compact warning circuitry with only few components, thereby providing a maintenance friendly, stable and reliable circuitry.

According to an embodiment of the invention, the first, the second, the third, the fourth, the fifth, the sixth and the seventh input signals and the first and the second output signals are binary signals. This may mean the input and output signals may resemble two different logic values such as e.g. "0" and "1" or "true" and "false", thereby representing two different states such as e.g. "on" and "off". The binary signals may also be provided by signals below and above a certain threshold in voltage and/or current, respectively.

According to an embodiment of the invention, the fourth input signal is a negation of the sixth input signal and the first input signal equals the fifth input signal.

In the context of binary signals, the "negation" may result in the fourth and sixth input signal being in an inverse state or having an inverse value with respect to each other. For instance, if the fourth input signal were a "0" signal, then the sixth input signal were a "1" signal and vice versa. The same applies for "true" and "false" values of the binary signals. Concerning a layout of the warning circuitry, such logic behavior may be realized for example by a bifurcation in an electrical line branching out in two different branches, wherein a first branch may be connected to the first logic gate and second branch may be connected to the second logic gate, while a negation member or an inverter element may be included in one of the branches. If an input signal is provided to such electrical line, inverse signals, i.e. signals which are inverse with respect to each other, may be provided in each branch. Accordingly, the inverter element may be arranged in either of the branches, i.e. it may be electrically connected to either of the logic gates.

Moreover, the wording "the first input signal equals the sixth" may be understood that both signals are identical in terms of their binary value, i.e. for instance both signals have a "0", a "1", a "true", or a "false" value. Concerning the layout of the warning circuitry, such logic behavior may be realized for example by a bifurcation in an electrical line connecting one branch to the first and one branch to the second logic gate, i.e. simply by connecting the first and second logic gates in parallel to an electrical line providing a single input signal.

According to an embodiment of the invention, the warning circuitry further comprises a buzzer circuitry electrically connected to the warning light circuitry. The buzzer circuitry comprises a first buzzer logic gate adapted for receiving the first output signal of the first logic gate and the seventh input signal. The buzzer circuitry further comprises a second buzzer logic gate adapted for receiving the second output signal of the second logic gate and an additional input signal. The buzzer circuitry further comprises a third buzzer logic gate electrically connected to the first and the second buzzer logic gate. The buzzer circuitry further comprises a buzzer electrically connected to the third buzzer logic gate. Therein the first buzzer logic gate is adapted for providing a first buzzer output signal to the third buzzer logic gate upon receiving the first output signal of the first logic gate and the seventh input signal. Furthermore, the second buzzer logic gate is adapted for providing a second buzzer output signal to the third buzzer logic gate upon receiving the second output signal of the second logic gate and the additional input signal. The third buzzer logic gate is adapted for triggering the buzzer upon receiving the first or the second buzzer output signal.

The wording "buzzer logic gate" may be understood as "a logic gate of the buzzer circuitry", and the wording "buzzer output signal" may be understood as "an output signal of the buzzer circuitry", thereby allowing to distinguish the logic gates and the output signals of the buzzer circuitry and the warning light circuitry.

The buzzer may for instance comprise a speaker, a piezo-siren or any other device being adapted for outputting an acoustic signal.

In general, the buzzer circuitry may be connected in parallel to the warning light circuitry, wherein the first buzzer logic gate may be connected in parallel to the first logic gate of the warning light circuitry and the seventh input signal. More precisely, the second buzzer logic gate may be connected in parallel with the third logic gate to an output channel of the first logic gate. Accordingly, the second buzzer logic gate may be connected in parallel with the third logic gate to an output channel of the second logic gate. Thus, the first buzzer logic gate may be adapted for receiving the first, the second, the third, the fourth input signals, e.g. by receiving the first output signal of the warning light circuitry, and the seventh input signal, whereas the second buzzer logic gate may be adapted for receiving the fifth, the sixth, the seventh, e.g. by receiving the second output signal of the warning light circuitry, and the additional input signal. Therefore, the first and the second buzzer logic gates may also be connected directly, i.e. independently of the warning light circuitry, to interfaces providing the corresponding input signals.

According to another embodiment of the invention, the first and the second buzzer logic gates are logic AND gates, and the third buzzer logic gate is a logic OR gate. Furthermore, the additional input signal and the first and the second buzzer output signals are binary signals. Therein, the additional input signal may be adapted for activating the buzzer.

This may mean that the additional input signal may serve to provide an optional activation for the buzzer circuitry of the warning circuitry. In other words, the buzzer may be optionally triggered by a presence or an absence of the additional input signal, thereby increasing a flexibility of the warning circuitry. For instance it may be favored to prevent the buzzer from outputting an acoustic signal under certain circumstances. Accordingly, the buzzer may not be triggered by not providing or by providing the additional input signal. Such circumstances may for example be a maintenance procedure of an aircraft comprising the warning circuitry. Apart from that, there might be national regulations in certain countries, which may prohibit an acoustic signal to be outputted in certain situations or scenarios.

Another aspect of the invention relates to warning device for an exterior door of an aircraft, wherein the warning device comprises a warning circuitry as described in the above and in the following.

The warning device may comprise various interfaces electrically connected to the warning circuitry and adapted for receiving primary input signals. The wording "primary input signal" may refer to an input signal provided to the warning circuitry via the interfaces in contrast to the "input signals" provided to and received by the logic gates and the buzzer logic gates of the warning circuitry. In this context, the various interfaces as described in the above and in the following may be regarded as being part of the warning circuitry or as being part of the warning device itself.

According to an embodiment of the invention, the warning device further comprises a first interface electrically connected to the first and the second logic gates and adapted for receiving a first primary input signal, on which the first and the fifth input signals are based. The warning device further comprises a second interface electrically connected to the first logic gate and adapted for receiving a second primary input signal, on which the second input signal is based. The warning device further comprises a third interface electrically connected to the first logic gate and adapted for receiving a third primary input signal, on which the third input signal is based. The warning device further comprises a fourth interface electrically connected to the first and the second logic gates and adapted for receiving a fourth primary input signal, on which the fourth and the sixth input signals are based. The warning device further comprises a fifth interface electrically connected the second logic gate and adapted for receiving a fifth primary input signal, on which the seventh input signal is based.

In other words, by receiving the first primary input signal via the first interface, the first and the fifth input signals may be provided to first and the second logic gates, respectively. By receiving the second primary input signal via the second interface, the second input signal may be provided to the first logic gate. By receiving the third primary input signal via the third interface, the third input signal may be provided to the first logic gate. Moreover, by receiving the fourth primary input signal, the fourth and the sixth input signals may be provided to the first and the second logic gates, respectively. By receiving the fifth primary input signal, the seventh input signal may be provided to the second logic gate.

Optionally, the fifth interface may be electrically connected to the first buzzer logic gate.

Apart from that, the warning device may comprise an additional interface electrically connected to the second buzzer logic gate and adapted for receiving an additional primary input signal, on which the additional input signal is based; i.e. by receiving the additional primary input signal via the additional interface, the additional input signal may be provided to the second buzzer logic gate.

Another aspect of the invention relates to an aircraft with an exterior door, wherein the exterior door comprises a warning circuitry or a warning device as described in the above and in the following.

The exterior door may not be limited to a cabin door of the aircraft, but may also comprise for instance a freight door, a service door, a flap, a window or any other access element of the aircraft. Each such exterior door may comprise an independent warning circuitry or warning device.

According to an embodiment of the invention, the warning circuitry is arranged in a window arrangement of the exterior door, such that the warning light of the warning circuitry is visible from an inside and an outside of the aircraft.

The window arrangement may for instance comprise at least one window and a window frame, which may be integrated in the exterior door.

Accordingly, the warning light may be arranged such that it may be perceptible by any personnel from either side of the window and thus it may be perceptible from either side of the exterior door. By being perceptible and/or visible from an inside and an outside of the aircraft it may be ensured that any warning, which may be indicated by an illumination of the warning light, may be brought to an intention of any person in line of sight of the window and/or the exterior door.

Also a buzzer may acoustically support the warning light, thereby further increasing a perceptibility of the warning. The buzzer may accordingly also be perceptible from either side of the window and or the door.

According to another embodiment of the invention the warning light is a red light. A red warning light may be used as a signal light indicating that the exterior door may be supposed to remain closed and/or locked. However, also other colors may be used such as e.g. orange, yellow, blue, green, violet, or any other color. The warning light may further be flashing or continuously illuminated in case a warning is triggered.

The "warning light" may in this context not only comprise a single warning light. It may rather comprise a plurality or a conglomerate of warning lights. For instance, the warning lights may be arranged circumferentially on and/or in the entire window frame or at least a part of it. For example a strip of warning lights, such as e.g. a strip of LED warning lights, may be arranged circumferentially around at least a part of the window and/or the window frame.

According to an embodiment of the invention, the aircraft comprises a control device adapted to trigger the warning circuitry by providing the input signals to the warning circuitry. Hence, the control device may be adapted for triggering the warning light and/or the buzzer of the warning circuitry.

The control device may be adapted for providing primary input signals, i.e. the first, the second, the fourth, the fifth, and the additional primary input signals, to the corresponding interfaces of the warning device or the warning circuitry, i.e. to the first, the second, the fourth, the fifth, and the additional interface of the warning device or warning circuitry. Consequently, the control device may be adapted for indirectly providing the first, the second, the fourth, the fifth, the sixth, the seventh and the additional input signals to the corresponding logic gates of the warning circuitry.

However, the control device may also comprise a plurality of separate and independent control units, each of which may be adapted for providing at least one primary input signal to the warning device and/or the warning circuitry. The control device or the control units may also be available redundantly to further increase a safety and reliability of the warning device. In other words, there might be a plurality of control devices arranged in the aircraft in a redundant manner. Also each control unit of each control device might be arranged in the aircraft in a redundant manner.

According to an embodiment of the invention, the first logic gate is adapted for providing the first output signal only if the first, the second, the third, and the fourth input signals are provided simultaneously to the first logic gate. The first input signal is provided indicating that no evacuation of the aircraft is in progress. The second input signal is provided indicating that the aircraft is located on a ground, such as e.g. an airport. The third input signal is provided indicating a residual air pressure in a cabin of the aircraft, i.e. a positive cabin air pressure with respect to an atmospheric pressure in an environment of the aircraft. The fourth input signal is provided indicating a disarmed slide of the aircraft, i.e. an emergency or evacuation slide of the aircraft being not armed.

The term "only if the first, the second, the third, and the fourth input signals are provided simultaneously" may refer to the respective conditions being fulfilled simultaneously at a certain instant, i.e. no evacuation is in progress, the aircraft is located on the ground, a residual pressure is present in the cabin, and the slide of the respective door is disarmed. The first, the second, the third, and the fourth input signals, which may correspond to these conditions, do not necessarily have to be triggered simultaneously, but may be triggered in an arbitrary sequence. Nonetheless, all these input signals may have to be provided at a certain instant, thereby indicting a fulfillment of the various conditions at this instant.

When the first output signal is provided by first logic gate of the warning light circuitry, the warning light may be triggered in response, thereby indicating that the exterior door may not be actuated and thus should remain closed and/or locked.

Accordingly, a purpose of the warning circuitry and the warning device may be that the warning light may be triggered in case a residual cabin air pressure is detected, i.e. in case a higher air pressure is detected in an interior region of an aircraft's cabin than in an exterior region of the aircraft's cabin. Such pressure difference may for instance be detected by a pressure difference sensor means, which may for example be adapted for determining an air pressure value of air surrounding the aircraft and a further air pressure value of cabin air. By comparing both values, the air pressure sensor means may detect a residual pressure in the cabin if the air pressure value of cabin air exceeds the air pressure value of the air surrounding the aircraft by a certain threshold value, such as e.g. 200 mbar. The threshold value may be specifiable.

The prescribed warning triggered by the first to fourth input signals may thus be considered as a "residual pressure warning". The residual pressure warning may be suppressed during a flight of the aircraft, i.e. the residual pressure warning may only be triggered if the aircraft is on ground. The residual pressure warning may also be suppressed during an evacuation process of the aircraft. Both conditions may be indicated to the warning device by providing appropriate and respective primary input signals to respective interfaces of the warning device, and accordingly by providing respective input signals to the first logic gate of the warning circuitry.

For this purpose, an evacuation indicating means, such as e.g. an evacuation button, may be arranged in the aircraft. If the evacuation button is activated, the respective primary signal may be provided to the warning device.

Furthermore, an "in flight" and/or "on ground" button may be arranged in the aircraft, and a respective primary input signal may be provided to the warning device. Also an engine and/or a landing gear of the aircraft may comprise sensor means indicating a stop of the engine and/or a deployed landing gear and thus indicating that the aircraft may be located on ground to the warning device.

Apart from that, the residual pressure warning may also be suppressed if the emergency slide of the exterior door is in an armed state. Also this condition may be indicated to the warning device by providing an appropriate and respective primary input signal to the respective interface of the warning device, and accordingly by providing the respective input signal to the first logic gate of the warning circuitry.

For example, there might be an emergency slide sensor or lever e.g. arranged on the exterior door, which may comprise two positions. The two positions of the emergency slide sensor/lever may be converted to corresponding signals, which may be used as primary input signals for the warning device. The emergency slide sensor/lever may for example comprise the two positions "armed" and "disarmed". During a flight the sensor/lever may be moved to the "armed" position. If the aircraft has landed, the "armed" position may indicate that opening the exterior door may be prohibited, unless there is an evacuation scenario. On ground, the sensor/lever may be moved to the "disarmed" position, thus indicating that the exterior door may be opened and/or unlocked, unless there is a residual pressure detected.

According to an embodiment of the invention, the second logic gate is adapted for providing the second output signal only if the fifth, the sixth, and the seventh input signals are provided simultaneously to the second logic gate. The fifth input signal is provided indicating that no evacuation of the aircraft is in progress. The sixth input signal is provided indicating an armed slide of the aircraft. The seventh input signal is provided indicating an actuation of the exterior door.

The term "only if the fifth, the sixth, and the seventh input signals are provided simultaneously" may refer to the respective conditions being fulfilled simultaneously at a certain instant, i.e. no evacuation is in progress, the slide of the respective door is armed, and the exterior door is actuated. The fifth, the sixth, and the seventh input signals, which may correspond to these conditions, do not necessarily have to be triggered simultaneously, but may be triggered in an arbitrary sequence. Nonetheless, all these input signals may have to be provided at a certain instant, thereby indicting a fulfillment of the various conditions at this instant.

When the second output signal is provided by the second logic gate, the warning light may be triggered in response, thereby indicating that the exterior door may not be actuated and thus should remain closed.

Accordingly, a further purpose of the warning circuitry and the warning device may be that the warning light may be triggered in case an actuation of the exterior door is detected if an emergency slide is still armed. Such warning may thus be considered as an "armed slide warning".

A primary input signal indicating an armed slide may be provided to the warning device if the emergency slide sensor/lever is in an armed position as described above. The armed slide warning may be suppressed during an evacuation process of the aircraft. Also this condition may be indicated to the warning device as described above.

Moreover, an "actuation" of the exterior door may for instance comprise a movement or actuation of a door handle or an electronic actuation of the door, for instance by actuating an electronic actuation means. For this purpose, a door opening and/or unlocking sensor means may be arranged on the door handle or on the electronic actuation means, which sensor means may detect an actuation of the door handle or the electronic actuation means and which sensor means may provide a respective primary input signal to the warning device.

According to an embodiment of the invention, a first buzzer logic gate is adapted for providing a first buzzer output signal, and thus to trigger a buzzer, only if the first, the second, the third, the fourth, and the seventh input signals are provided simultaneously to the warning circuitry. The first input signal is provided indicating that no evacuation of the aircraft is in progress. The second input signal is provided indicating that the aircraft is on a ground. The third input signal is provided indicating a residual air pressure in a cabin of the aircraft. The fourth input signal is provided indicating a disarmed slide of the aircraft. The seventh input signal is provided indicating an actuation of the exterior door.

The term "only if the first, the second, the third, and the fourth, and the seventh input signals are provided simultaneously" may refer to the respective conditions being fulfilled simultaneously at a certain instant, i.e. no evacuation is in progress, the aircraft is located on the ground, a residual pressure is present in the cabin, the slide of the respective door is disarmed, and the door is actuated. The first, the second, the third, the fourth, and the seventh input signals, which may correspond to these conditions, do not necessarily have to be triggered simultaneously, but may be triggered in an arbitrary sequence. Nonetheless, all these input signals may have to be provided at a certain instant, thereby indicting a fulfillment of the various conditions at this instant.

This may mean that an acoustic warning may be triggered if the warning light is triggered due to a residual pressure warning and additionally e.g. a door handle or an electronic actuation means of an exterior door is actuated. Such acoustic warning may prevent a user, e.g. a cabin attendant, to open, unlock and/or actuate a door if a residual pressure is present in the cabin.

According to yet another embodiment of the invention, a second buzzer logic gate is adapted for providing a second buzzer output signal, and to trigger a buzzer, only if the fifth, the sixth, and the seventh input signals as well as an additional input signal are provided simultaneously to the warning circuitry. The fifth input signal is provided indicating that no evacuation of the aircraft is in progress. The sixth input signal is provided indicating an armed slide of the aircraft. The seventh input signal is provided indicating an actuation of the exterior door. The additional input signal is provided indicating an activation of the buzzer.

The term "only if the fifth, the sixth, the seventh, and the additional input signals are provided simultaneously" may refer to the respective conditions being fulfilled simultaneously at a certain instant, i.e. no evacuation is in progress, the slide of the respective door is armed, the exterior door is actuated, and the buzzer is activated. The fifth, the sixth, the seventh, and the additional input signals, which may correspond to these conditions, do not necessarily have to be triggered simultaneously, but may be triggered in an arbitrary sequence. Nonetheless, all these input signals may have to be provided at a certain instant, thereby indicting a fulfillment of the various conditions at this instant.

This may mean that an acoustic warning may be triggered if the additional input signal is provided and the slide armed warning is triggered as described in the above. More precisely, the acoustic warning may be triggered if the additional primary signal is provided to the warning device (and thus the additional input signal is provided to the second buzzer logic gate) and an actuation of the exterior door is detected while an emergency slide is armed. Such acoustic warning may prevent a user, e.g. a cabin attendant, to open, unlock and/or actuate a door if an emergency slide of an exterior door is still armed, while no evacuation is in progress.

It may be noted here, that the warning device as integrated in an exterior door of an aircraft may be designed as a self-sufficient device. A design as a self-sufficient device may make it possible to retrofit the device in an easy way, since it may be implemented as a black-box or a retrofit set for an aircraft. The warning device may be functioning as a stand-alone device even without being powered by a power supply of the aircraft or any other external power supply, as it may have its own power supply device. The term "self-sufficient device" may thus refer to a device that may not require any additional components for a complete functioning. However, it may be advantageous to integrate already existing devices, such as e.g. sensor elements, to the warning device. For example an existing pressure difference sensor means or an emergency slide sensor/lever could be connected to the self-sufficient warning device.

As stated above, the warning device may have its own power supply device, i.e. a power supply device that is operable independently of a cabin or aircraft power supply. The warning device may also comprise various power supply devices, such as e.g. electro-chemical power supply devices. This may for instance comprise accumulator batteries or batteries, which may store electrical energy over an extended period of time. The power supply device may also comprise a capacitor or power capacitor or a bank of capacitors which advantageously may provide electrical energy to the warning device, while having a comparatively light intrinsic weight. Furthermore, it may be possible to use a regenerative power supply device. Examples of regenerative power supply devices may comprise solar cells or power supply devices adapted for drawing energy from movement and/or pressure and/or heat.

If technically possible but not explicitly mentioned, also combinations of embodiments of the invention described in the above and in the following may be embodiments of the warning circuitry, the warning device and the aircraft comprising such warning circuitry or warning device.

These and other aspects of the invention will be apparent from and elucidated with reference to the embodiments described hereinafter.

BRIEF DESCRIPTION OF THE DRAWINGS

Below, embodiments of the present invention are described in more detail with reference to the attached drawings.

In principle, identical parts are provided with the same reference symbols in the figures.

DETAILED DESCRIPTION

Figure 1:
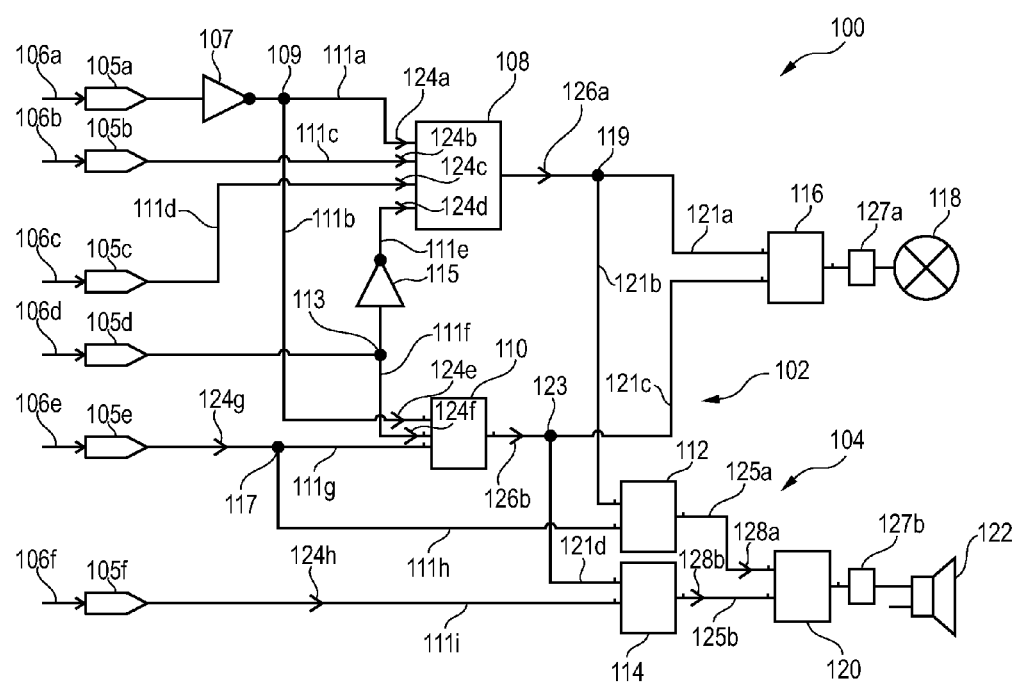
FIG. 1 schematically shows a warning circuitry according to an embodiment of the invention.

FIG. 1 schematically shows a warning circuitry 100 according to an embodiment of the invention.

The warning circuitry 100 comprises a warning light circuitry 102 and a buzzer circuitry 104.

The warning light circuitry 104 comprises a first interface 105a adapted for receiving a first primary input signal 106a, a second interface 105b adapted for receiving a second primary input signal 106b, a third interface 105c adapted for receiving a third primary input signal 106c, a fourth interface 105d adapted for receiving a fourth primary input signal 106d, and a fifth interface 105e adapted for receiving a fifth primary input signal 106e.

The buzzer circuitry 104 of the warning circuitry 100 comprises a further, additional interface 105f adapted for receiving an additional primary input signal 106f.

The primary input signals may be binary signals or they may be converted by the interfaces 105a to 105f to binary signals.

The first interface 105a is electrically connected with an electrical line to an inverter element 107 adapted for inverting the first primary input signal 106a. The inverter element 107 may be adapted for outputting a certain binary signal if no signal is provided to the inverter element 107. The inverter element 107 is electrically connected via an electrical line with a bifurcation 109 branching out in a branch 111a and branch 111b of electrical lines. The branch 111a is connected to a first logic AND gate 108 of the warning light circuitry 102 and the branch 111b is connected to a second logic AND gate 110.

The second interface 105b is connected with an electrical line 111c to the first logic AND gate 108, and the third interface 105c is connected with an electrical line 111d to the first logic AND gate 108.

The fourth interface 105d is electrically connected via an electrical line with a bifurcation 113 branching out in a branch 111e and a branch 111f of electrical lines. The branch 111e is connected via an inverter element 115 to the first logic AND gate 108, whereas the branch 111f is directly connected to the second logic AND gate 110.

The fifth interface 105e is electrically connected via an electrical line with a bifurcation 117 branching out in a branch 111g and a branch 111h. The branch 111g is electrically connected to the second logic AND gate 110 of the warning light circuitry 102, whereas the branch 111h is electrically connected to a first buzzer logic AND gate 112.

The sixth interface 105f is electrically connected to a second buzzer logic AND gate 114.

The first logic AND gate 108 of the warning light circuitry 102 is further connected with a bifurcation 119 branching out in a branch 121a and a branch 121b. The branch 121a is electrically connected to a third logic OR gate 116 of the warning light circuitry 102, whereas the branch 121b is electrically connected to the first buzzer logic AND gate 112.

The second logic AND gate 110 of the warning light circuitry 102 is connected with a bifurcation 123 branching out in a branch 121c and a branch 121d. The branch 121c is electrically connected to the third logic OR gate 116 of the warning light circuitry 102, whereas the branch 121d is electrically connected to the second buzzer logic AND gate 114.

The third logic OR gate 116 of the warning light circuitry 102 is electrically connected to a warning light 118.

Furthermore, the first buzzer logic AND gate is connected with an electrical line 125a to a third buzzer logic OR gate 120. The second buzzer logic AND gate 114 is connected with an electrical line 125b to the third buzzer logic OR gate 120, as well. The third buzzer logic OR gate 120 is in turn electrically connected to a buzzer 122 of the buzzer circuitry 122.

As can be seen in FIG. 1, the first logic AND gate 108 of the warning light circuitry 102 is adapted for receiving a first input signal 124a via electrical line 111a, a second input signal 124b via line 111c, a third input signal 124c via electrical line 111d, and a fourth input signal 124d via electrical line 111e. The input signals 124a to 124d may be provided to the first logic AND gate 108 via respective input channels.

Generally, in response to the input signals 124a to 124d, the first logic AND gate 108 outputs a first output signal 126a. The first output signal 126a may be provided by a respective output channel of the first logic AND gate 108 and conducted via the electrical line 121a to the third logic OR gate 116.

In response to receiving the first output signal 126a, the third logic OR gate 116 triggers the warning light 118, wherein a further member 127a may take over an actual actuation of the warning light 118. The further member 127a may for this purpose comprise a switch element which may be triggered by third logic OR gate 116. The further member 127a may also comprise an amplifier, which may amplify a signal provided by the third logic OR gate 116 to the warning light 118. The further member 127a may also comprise a power supply powering the warning light 118.

Correspondingly to the first logic AND gate 108, the second logic AND gate 110 of the warning light circuitry 102 is adapted for receiving a fifth input signal 124e via electrical line 111b, a sixth input signal 124f via line 111f, a seventh input signal 124g via electrical line 111g. The input signals 124e to 124g may be provided to the second logic AND gate 110 via respective input channels.

The fifth input signal 124e equals the first input signal 124a, i.e. both input signals may have the same binary value. Moreover, 124d is a negation or the inverse of the input signal 124f due to the inverter element 115, i.e. both signals have opposing or inverse binary values with respect to each other.

Generally, in response to the input signals 124e to 124g, the second logic AND gate 110 outputs a second output signal 126b. The second output signal 126b may be provided by a respective output channel of the second logic AND gate 110 and conducted via the electrical line 121c to the third logic OR gate 116.

In response to receiving the second output signal 126b, the third logic OR gate 116 triggers the warning light 118, wherein again the further member 127a may take over the actual actuation of the warning light 118, as described above.

As a consequence, the warning light 118 is triggered by the third logic OR gate 116 if the first output signal 126a or the second output signal 126b is provided. In case both output signals 126a, 126b are provided simultaneously, an error signal may be triggered by the warning circuitry 100.

Additionally, the first output signal 126a is conducted via the bifurcation 119 to the first buzzer logic AND gate 112. In case the first buzzer logic AND gate 112 further receives the input signal 124g via the bifurcation 117 and electrical line 111h, the first buzzer logic AND gate 112 outputs a first buzzer output signal 128a to the third buzzer logic OR gate 120.

In response to receiving the first buzzer output signal 128a, the third buzzer logic OR gate 120 triggers the buzzer 122, wherein a further member 127b may take over an actual actuation of the buzzer 122. The further member 127b may for this purpose comprise a switch element which may be triggered by third buzzer logic OR gate 120. The further member 127b may also comprise an amplifier, which may amplify a signal provided by the third buzzer logic OR gate 120 to the buzzer 122. The further member 127b may also comprise a power supply powering the buzzer 122.

Moreover, the second output signal 126b is conducted via the bifurcation 123 to the second buzzer logic AND gate 114. In case the second buzzer logic AND gate 114 further receives an additional input signal 124h via electrical line 111i, the second buzzer logic AND gate 114 outputs a second buzzer output signal 128b to the third buzzer logic OR gate 120.

In response to receiving the second buzzer output signal 128b, the third buzzer logic OR gate 120 triggers the buzzer 122, wherein the further member 127b may take over the actual actuation of the buzzer 122.

To summarize, if the first to fourth input signals 124a to 124d are provided to the first logic AND gate 108, the first output signal 126a is provided, which triggers the warning light 118. If additionally the input signal 124g is provided to the first buzzer logic AND gate 112, also the buzzer 122 is triggered.

Furthermore, if the fifth to seventh input signals 124e to 124g are provided to the second logic AND gate 110, the second output signal 126b is provided, which triggers the warning light 118. If additionally the additional input signal 124h is provided to the second buzzer logic AND gate 114, also the buzzer 122 is triggered.

The warning circuitry 100 of FIG. 1 and its functioning is further elucidated in the following, particularly in FIG. 2.

Figure 2:
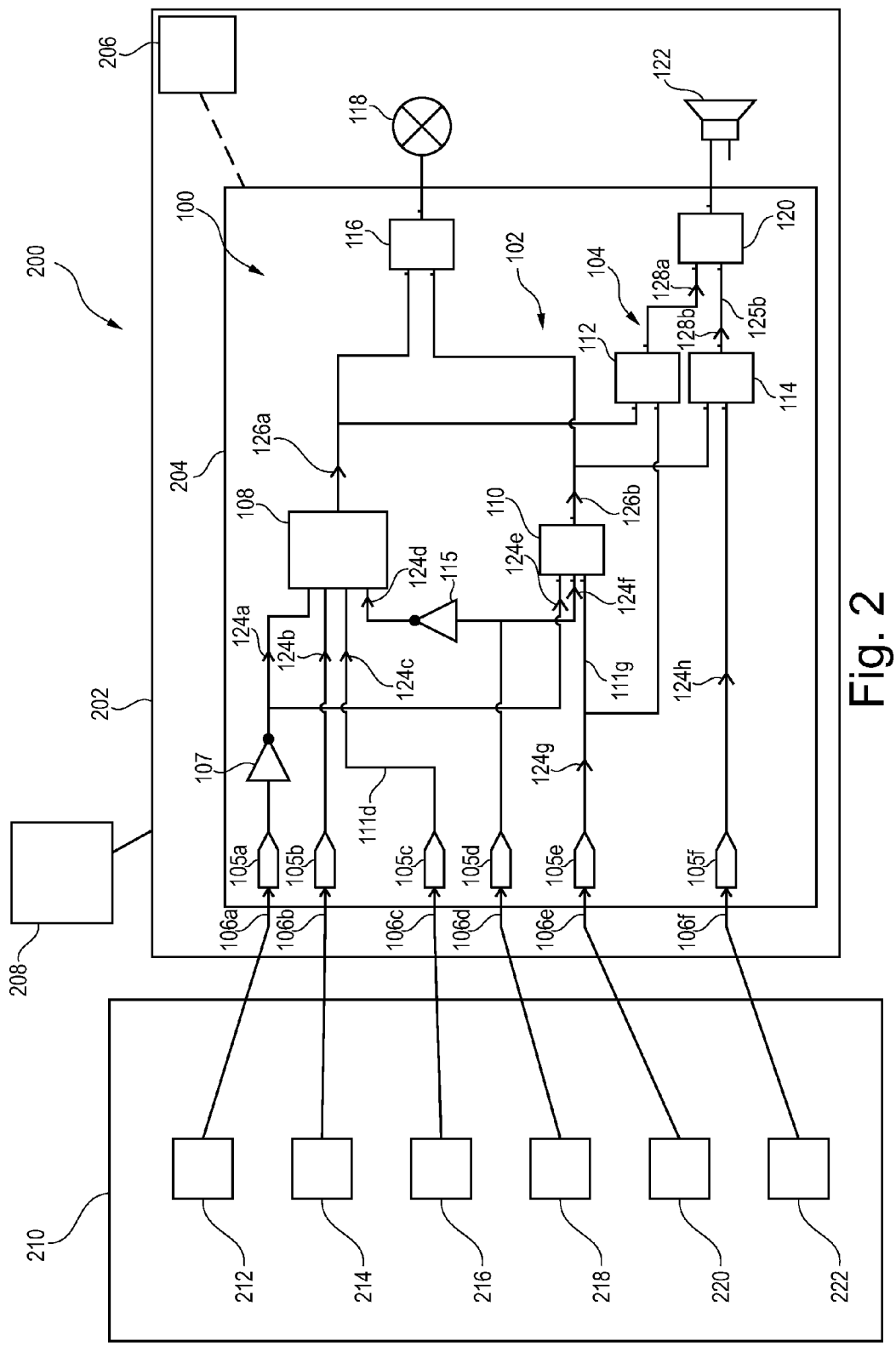
FIG. 2 schematically shows a warning device according to an embodiment of the invention and a control device.

FIG. 2 schematically shows a warning device 200 according to an embodiment of the invention and a control device.

The warning device 200 comprises a housing 202, in which a warning circuitry 100 is arranged on a circuit board 204. If not stated otherwise, the warning circuitry 100 of FIG. 2 comprises the same elements and features as the warning circuitry 100 of FIG. 1.

The warning device 200 further comprises a power supply device 206 adapted for powering the warning circuitry 100. The power supply device 206 may for example be an electro-chemical power supply device comprising e.g. accumulator batteries or batteries. The power supply device 206 may also comprise a capacitor or power capacitor or a bank of capacitors which advantageously may provide electrical energy to the warning device 200. It may also be possible to use a regenerative power supply device 206 e.g. comprising solar cells or power supply devices adapted for drawing energy from movement and/or pressure and/or heat.

Additionally to the power supply device 206, the warning device 200 may be connected to an external power supply 208.

The warning device 200 is connected to a control device 210 of an aircraft, wherein the control device 210 may be a single device or may comprise various control units, which be arranged at arbitrary locations in the aircraft.

The control device 200 comprises an "evacuation control unit" 212, which for may instance comprise an "evacuation button" in a cockpit of the aircraft. In case an evacuation of the aircraft is in progress, a respective first primary input signal 106a may be triggered by the evacuation control unit 212 and transferred to the first interface 105a. If no evacuation is in progress, there might be no first primary input signal 106a, and the inverter element 107 may provide the binary first input signal 124a and the fifth input signal 124e with a certain binary value, such as e.g. a "true" value, in response.

The control device 200 further comprises an "on ground control unit" 214, which may also be a button somewhere in the cockpit or any other suitable indication means adapted for indicating that the aircraft has landed. The on ground control unit 214 may be adapted for providing the second primary signal 106b to the second interface 105b of the warning device 200. If the aircraft is located on ground, the second primary signal 106b may be converted, e.g. by the second interface 105b, to the second input signal 124b having a certain binary value, such as e.g. a "true" value.

Apart from that, the control device 200 comprises a pressure difference sensor means 216 adapted for detecting a residual pressure in a cabin of the aircraft. In case the pressure difference sensor means 216 detects a pressure in the cabin exceeding a pressure in an outside environment of the aircraft by a certain amount, e.g. by 200 mbar, the pressure difference sensor means provides the third primary input signal 106c to the third interface 105c of the warning device 100, and the third input signal 124c may be provided having a certain binary value, such as e.g. a "true" value.

The control device 200 further comprises an emergency slide sensor means 218, which may for instance comprise a lever with an "armed" and a "disarmed" position indicating that an emergency of an exterior door is armed or disarmed. If the emergency slide sensor means 218 detects an armed slide, a respective fourth primary input signal 106d is provided to the fourth interface 105d of the warning device 200. If the fourth primary input signal 106d indicating an armed slide is provided, the signal may be converted by the inverter element 115 to the fourth input signal 124d having a certain binary value, such as e.g. a "false" value. Simultaneously the sixth input signal 124f is provided having a certain binary value, such as e.g. a "true" value, which is an inverse binary value of the fourth input signal 124d. Vice versa, if the slide is in a disarmed position, the fourth input signal 124d may have e.g. a "true" value and the sixth input signal 124f may have e.g. a "false" value.

Moreover, the control device 200 comprises a sensor means 220 adapted for detecting an actuation of the exterior door. E.g. the sensor means 220 may comprise a sensor arranged on a handle of the exterior door, wherein a movement or actuation of the door may be detected if the handle is moved by several degrees, e.g. by 2°. In response to an actuation of the exterior door, the sensor means 220 may provide the primary inputs signal 106e to the interface 105e of the warning device 200, and the seventh input signal 124g is provided having a certain binary value, such as e.g. a "true" value.

Additionally, the control device 210 comprises an activation means 222, which may also be a button or any other activation element, such as e.g. a switch. If the activation means 222 is activated the primary input signal 106f is provided to the interface 105f of the warning device and the additional input signal 124h is provided having a certain binary value, such as e.g. a "true" value.

The warning device 100 in the constellation shown in FIG. 2 may fulfill two different purposes. First, it may be adapted for providing a "residual pressure warning", and second it may be adapted for providing an "armed slide warning". The respective functions carried out by the warning device 100 are described in the following.

The "residual pressure warning":

Since the first logic AND gate 108 is a logic AND gate, it will only provide the first output signal 126a if the first, the second, the third, and the fourth input signals 124a to 124d have the same binary values, such as e.g. "true" values. This is the case if no evacuation is in progress, the aircraft is located on ground, a residual pressure is detected, and the emergency slide is disarmed. If all these conditions are fulfilled, the first output signal 126a is provided to the third logic OR gate 116, and the warning light is triggered.

If additionally the exterior door is actuated and the seventh input signal 124g is provided with the same binary value, such as e.g. a "true" value, to the first buzzer logic AND gate 112, the first buzzer output signal 128a is provided to the third buzzer logic OR gate 120. In response, the buzzer 122 may be triggered additionally to the warning light 118.

The "armed slide warning":

Since the second logic AND gate 110 is a logic AND gate, it will only provide the second output signal 126b if the fifth, the sixth, and the seventh input signals 124e to 124g have the same binary values, such as e.g. "true" values. This is the case if no evacuation is in progress, the emergency slide is armed, and the exterior door is actuated. If all these conditions are fulfilled, the second output signal 126b is provided to the third logic OR gate 116, and the warning light is triggered.

If additionally the additional input signal 124h is provided with the same binary value, such as e.g. a "true" value, to the second buzzer logic AND gate 114, the second buzzer output signal 128b is provided to the third buzzer logic OR gate 120. In response, the buzzer 122 will be triggered additionally to the warning light 118.

As the third logic OR gate 118 and the third buzzer logic OR gate 120 are OR gates, basically the first and the second output signals 126a, 126b may trigger the warning light 118, and the first and the second buzzer output signals 128a, 128b may trigger the buzzer 122. However, due to the inverter element 115 the "residual pressure warning" and the "armed slide warning" may be regarded as mutually exclusive warnings.

Figure 3:
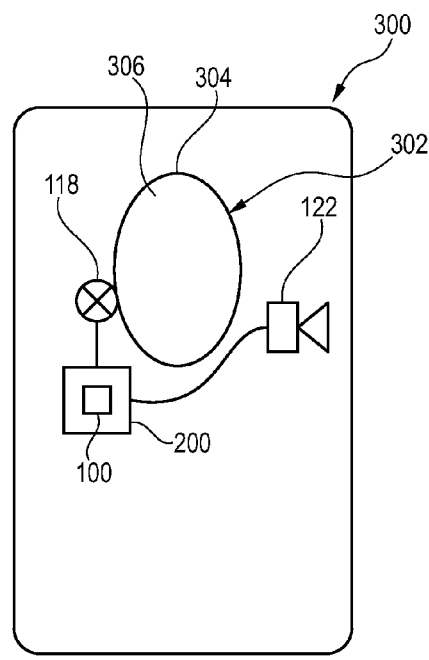
FIG. 3 shows an exterior door of an aircraft with a warning device according to an embodiment of the invention.

FIG. 3 shows an exterior door 300 of an aircraft with a warning device 200 according to an embodiment of the invention, wherein the warning device 200 comprises a warning circuitry 100. If not stated otherwise, the warning circuitry 100 and the warning device 200 of FIG. 3 comprise the same elements and features as the warning circuitry of FIG. 1 and the warning device 200 of FIG. 2.

The exterior door 300 further comprises a window arrangement 302 with a window frame 304 and a window 302.

The warning light 118 of the warning circuitry 100 or of the warning device 200, respectively, is arranged in the window arrangement 302 such that it is perceptible from either side of the exterior door 300, i.e. it is perceptible from both sides of the plane of perception of FIG. 3.

Figure 4:
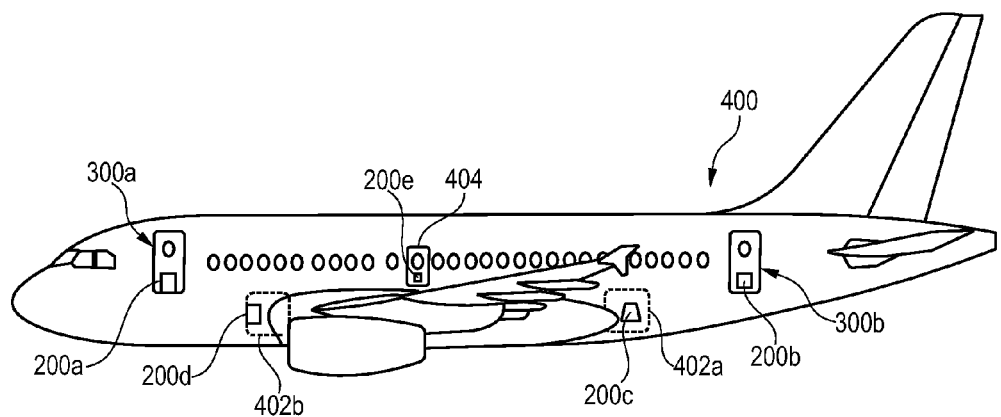
FIG. 4 shows an aircraft with a warning device according to an embodiment of the invention.

FIG. 4 shows an aircraft 400 according to an embodiment of the invention. The aircraft 400 comprises various cabin doors 300a, 300b and freight flaps 402 a, 402b, and an emergency door 404, each of which comprise an independent warning device 200a to 200e with an independent warning circuitry.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A warning circuitry with a warning light circuitry for an exterior door of an aircraft, the warning light circuitry comprising:
    a first logic gate adapted for receiving a first, a second, a third, and a fourth input signal;
    a second logic gate adapted for receiving a fifth, a sixth, and a seventh input signal;
    a third logic gate electrically connected to the first and second logic gate;
    a warning light electrically connected to the third logic gate; and
    a buzzer circuitry electrically connected to the warning light circuitry, the buzzer circuitry comprising:
    a first buzzer logic gate adapted for receiving a first output signal of the first logic gate and the seventh input signal;
    a second buzzer logic gate adapted for receiving a second output signal of the second logic gate and an additional input signal;
    a third buzzer logic gate electrically connected to the first and the second buzzer logic gate; and
    a buzzer electrically connected to the third buzzer logic gate;

wherein the first logic gate is adapted for providing the first output signal to the third logic gate upon receiving the first, the second, the third, and the fourth input signals,
    wherein the second logic gate is adapted for providing the second output signal to the third logic gate upon receiving the fifth, the sixth, and the seventh input signals,
    wherein the third logic gate is adapted for triggering the warning light upon receiving the first or the second output signal,
    wherein the first buzzer logic gate is adapted for providing a first buzzer output signal to the third buzzer logic gate upon receiving the first output signal of the first logic gate and the seventh input signal,
    wherein the second buzzer logic gate is adapted for providing a second buzzer output signal to the third buzzer logic gate upon receiving the second output signal of the second logic gate and the additional input signal,
    wherein the third buzzer logic gate is adapted for triggering the buzzer upon receiving the first or the second buzzer output signal.

2. The warning circuitry of claim 1,
    wherein the first and the second logic gates are logic AND gates, and
    wherein the third logic gate is a logic OR gate.

3. The warning circuitry of claim 1, wherein the first, the second, the third, the fourth, the fifth, the sixth and the seventh input signals and the first and the second output signals are binary signals.

4. The warning circuitry of claim 1,
    wherein the fourth input signal is a negation of the sixth input signal, and
    wherein the first input signal equals the fifth input signal.

5. The warning circuitry of claim 1,
    wherein the first and the second buzzer logic gates are logic AND gates;
    wherein the third buzzer logic gate is a logic OR gate;
    wherein the additional input signal and the first and the second buzzer output signals are binary signals; and
    wherein the additional input signal is adapted for activating the buzzer.

6. A warning device for an exterior door of an aircraft, the warning device comprising:
    a warning circuitry with a warning light circuitry for an exterior door of an aircraft, the warning light circuitry comprising:
    a first logic gate adapted for receiving a first, a second, a third, and a fourth input signal;
    a second logic gate adapted for receiving a fifth, a sixth, and a seventh input signal;
    a third logic gate electrically connected to the first and second logic gate;
    a warning light electrically connected to the third logic gate;
    a first interface electrically connected to the first and the second logic gates and adapted for receiving a first primary input signal, on which the first and the fifth input signals are based;
    a second interface electrically connected to the first logic gate and adapted for receiving a second primary input signal, on which the second input signal is based;
    a third interface electrically connected to the first logic gate and adapted for receiving a third primary input signal, on which the third input signal is based;

a fourth interface electrically connected to first and the second logic gates and adapted for receiving a fourth primary input signal, on which the fourth and the sixth input signals are based; and a fifth interface electrically connected the second logic gate and adapted for receiving a fifth primary input signal, on which the seventh input signal is based, wherein the first logic gate is adapted for providing a first output signal to the third logic gate upon receiving the first, the second, the third, and the fourth input signals, wherein the second logic gate is adapted for providing a second output signal to the third logic gate upon receiving the fifth, the sixth, and the seventh input signals, and wherein the third logic gate is adapted for triggering the warning light upon receiving the first or the second output signal.

7. An aircraft with an exterior door, the exterior door comprising:
a warning circuitry with a warning light circuitry for an exterior door of an aircraft, the warning light circuitry comprising:
a first logic gate adapted for receiving a first, a second, a third, and a fourth input signal;
a second logic gate adapted for receiving a fifth, a sixth, and a seventh input signal;
a third logic gate electrically connected to the first and second logic gate; and
a warning light electrically connected to the third logic gate;
wherein the first logic gate is adapted for providing a first output signal to the third logic gate upon receiving the first, the second, the third, and the fourth input signals;
wherein the second logic gate is adapted for providing a second output signal to the third logic gate upon receiving the fifth, the sixth, and the seventh input signals;
wherein the third logic gate is adapted for triggering the warning light upon receiving the first or the second output signal, or
a warning device for an exterior door of the aircraft, the warning device comprising the warning circuitry, and
wherein the first logic gate is adapted for providing the first output signal only if:
the first input signal indicates that no evacuation of the aircraft is in progress,
the second input signal indicates that the aircraft is located on a ground,
the third input signal indicates a residual air pressure in a cabin of the aircraft, and
the fourth input signal indicates a disarmed slide of the aircraft, or
wherein the second logic gate is adapted for providing the second output signal only if:
the fifth input signal indicates that no evacuation of the aircraft is in progress,
the sixth input signal indicates an armed slide of the aircraft, and
the seventh input signal indicates an actuation of the exterior door, or
wherein a first buzzer logic gate is adapted for providing a first buzzer output signal only if:
the first input signal indicates that no evacuation of the aircraft is in progress,
the second input signal indicates that the aircraft is on a ground,
the third input signal indicates a residual air pressure in a cabin of the aircraft,
the fourth input signal indicates a disarmed slide of the aircraft, and
the seventh input signal indicates an actuation of the exterior door, or
wherein a second buzzer logic gate is adapted for providing a second buzzer output signal only if:
the fifth input signal indicates that no evacuation of the aircraft is in progress,
the sixth input signal indicates an armed slide of the aircraft,
the seventh input signal indicates an actuation of the exterior door, and
an additional input signal indicates an activation of a buzzer.

8. The aircraft of claim 7, wherein the warning circuitry is arranged in a window arrangement of the exterior door, such that the warning light of the warning circuitry is visible from an inside and an outside of the aircraft.

9. The aircraft of claim 7, further comprising:
a control device adapted to trigger the warning circuitry by providing the first, the second, the third, the fourth, the fifth, the sixth, and the seventh input signals to the warning circuitry.

* * * * *